No. 690,240. Patented Dec. 31, 1901.
W. CUTLER.
CONSTRUCTION OF UNION CASKS USED IN BREWING OPERATIONS.
(Application filed June 5, 1899.)

(No Model.) 3 Sheets—Sheet 1.

Witnesses:
Geo. N. Rea.
W. Lee Helms.

Inventor
William Cutler
By James L. Norris,
Atty

THE NORRIS PETERS CO., PHOTO-LITHO., WASHINGTON, D. C.

No. 690,240. Patented Dec. 31, 1901.
W. CUTLER.
CONSTRUCTION OF UNION CASKS USED IN BREWING OPERATIONS.
(Application filed June 5, 1899.)
(No Model.) 3 Sheets—Sheet 2.
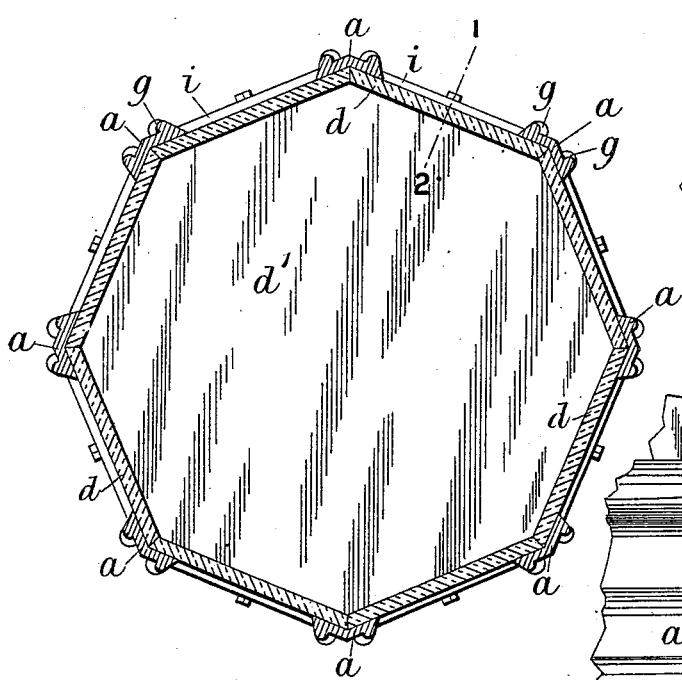
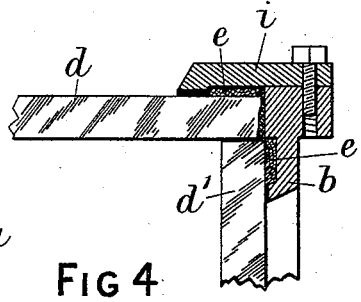
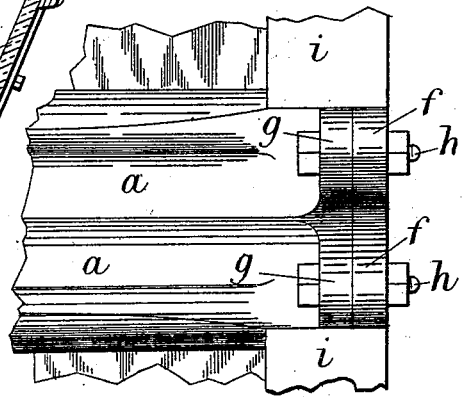

No. 690,240. Patented Dec. 31, 1901.
W. CUTLER.
CONSTRUCTION OF UNION CASKS USED IN BREWING OPERATIONS.
(Application filed June 5, 1899.)
(No Model.) 3 Sheets—Sheet 3.

UNITED STATES PATENT OFFICE.

WILLIAM CUTLER, OF BIRMINGHAM, ENGLAND.

CONSTRUCTION OF UNION-CASKS USED IN BREWING OPERATIONS.

SPECIFICATION forming part of Letters Patent No. 690,240, dated December 31, 1901.

Application filed June 5, 1899. Serial No. 719,477. (No model.)

*To all whom it may concern:*

Be it known that I, WILLIAM CUTLER, manufacturer, a subject of the Queen of Great Britain, residing at Cannon Works, Constitution Hill, Birmingham, England, have invented certain new and useful Improvements in the Construction of Union-Casks Used in Brewing Operations, of which the following is a specification.

The object of my invention is to effect improvements in the construction of union or fermenting casks used in brewing operations. These union-casks are used in the brewing trade for what is called the "closed" system—that is, the wort after being boiled is cooled and is then put into these union-casks, which are of substantially barrel form, to work or ferment, and all the barm passes through the bung-holes and up pipes called "swannecks," and then into barm-troughs. Union-casks are only used for one purpose—that is, for fermenting ale, beer, or stout.

The invention consists in constructing such casks of glass plates held together in the desired form by a framework of wood, metal, or other suitable material.

In order that my said invention may be particularly described and ascertained, reference is hereby made to the accompanying drawings, in which similar letters of reference indicate corresponding parts.

Figure 1:
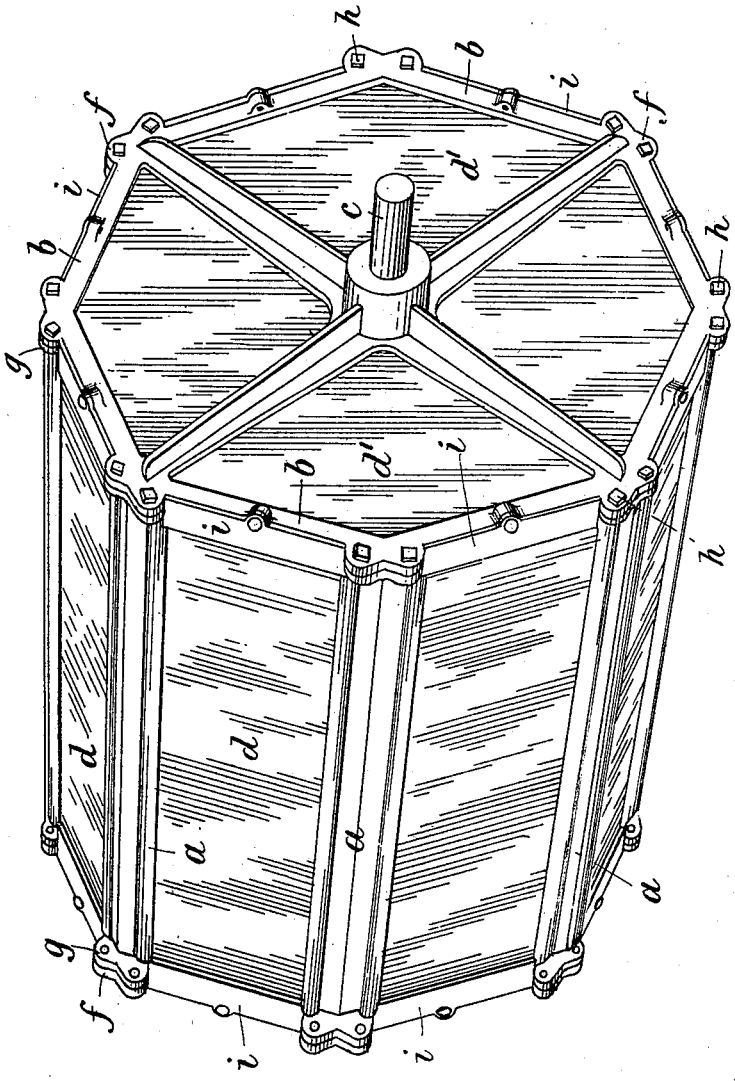
Figure 5:
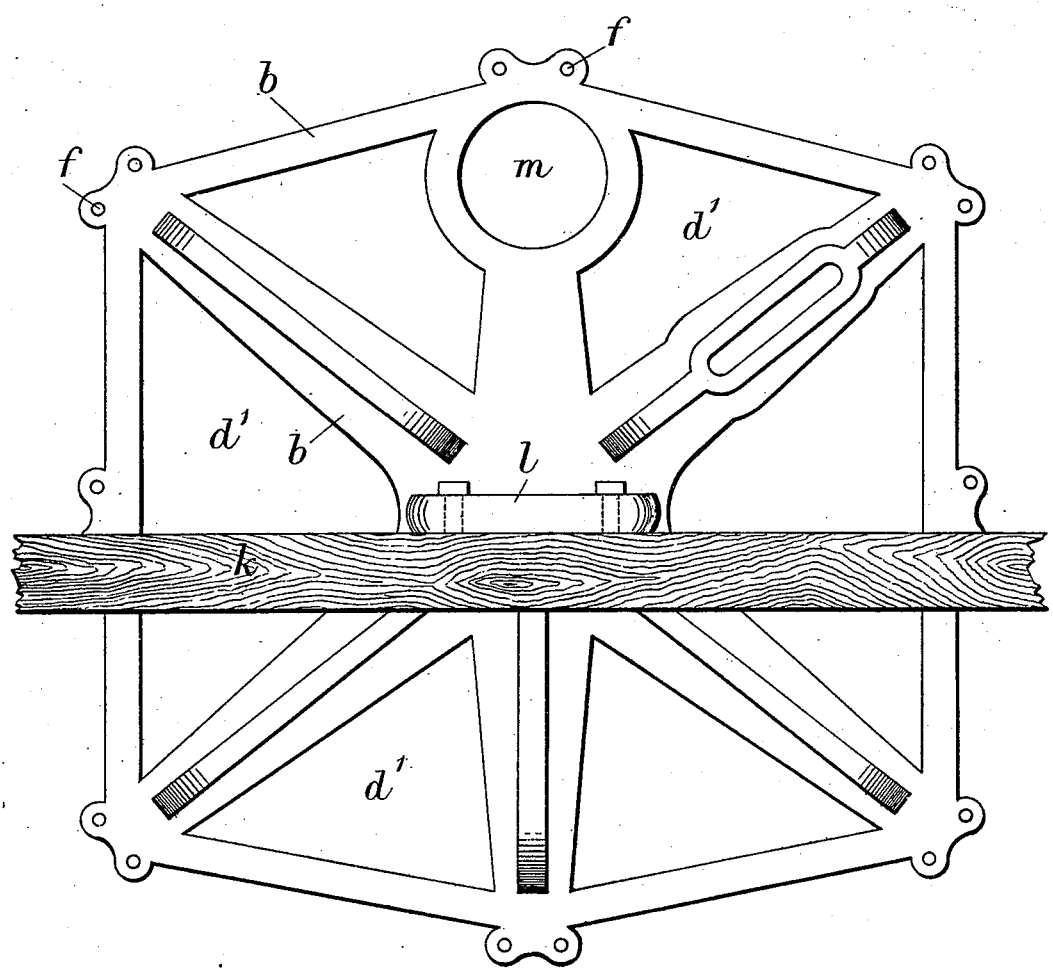

Figure 1 is a perspective view of a fermenting or union cask formed of glass plates in a framework of metal. Fig. 2 is a transverse section. Fig. 3 is a section on the line 1 2 of Fig. 2. Fig. 4 is a plan view of a portion of one of the ribs of the frame, illustrating a method of attaching the same to the end frames. Fig. 5 is an elevation of an end frame of a cask constructed not to revolve.

The framework is made up of a number of ribs $a$ and end frames $b$, the latter being preferably cast in one piece, the whole of the framework being preferably of galvanized cast-iron. The end frames may carry spindles $c$, which may be made hollow to communicate with the interior of the cask, by which the cask may rotate in bearings mounted on a suitable frame or support, or they are fixed to cross-beams $k$, Fig. 5, by plates $l$ and bolts, as shown, as practiced in washing or cleansing the cask. Plates of glass $d$ $d'$ are fitted to the ribs and end frames and are held in place by means of cement, which also renders the joint fluid-tight. Preferably the end plates of glass $d'$ are arranged to support the side plates $d$, as shown in Fig. 3, $e$ representing the cement. If the glass used has an uneven surface, I prefer to bed the glass in a hard cement to form an even bearing for the glass and render the joint fluid-tight after the bed has set. The cement is located in grooves or rabbets, as shown in Fig. 3.

The ribs $a$ are formed of a section approximately as shown in Fig. 2 (the rabbets and cement being omitted) and are bolted to the end frames in any suitable manner, one method being shown in Fig. 4. Each corner of the end frame is formed with a pair of lugs $f f$, and similar lugs $g g$ are formed on the ends of the ribs. Bolts $h h$ serve to fix the ribs to the end frames. Similarly I provide plates $i$, which fit between the lugs $f$ and serve to fix the glass firmly. The plates $i$ are also grooved to receive cement and are bolted to the end frames.

The end frames $b$ may be formed with an opening $m$, Fig. 5, to allow of the introduction of a man's arm with a hose-pipe or a brush, whereby the interior may be thoroughly cleansed, the opening being normally closed by a suitable plug.

It will thus be seen that the interior of the cask is completely lined with glass, no metal being exposed to the liquors. By these means increased durability and freedom from acidity are secured, and there is no danger of sediment or dirt being overlooked, as is the case when ordinary wooden unions are used.

The usual union-cask is made revoluble in order to thoroughly cleanse its interior, boiling water having to be employed. Also it is necessary to carefully inspect the interior, and when not in use the casks have to be submitted to sulfur-vapor every few days in order to keep them sweet. My improved union-cask is made revoluble to conform to the requirements of certain brewers and fixed to suit other brewers' tastes. There is absolutely no real necessity for revolving it, by reason of its natural cleanliness. It is not necessary to use boiling water, as cold water will suffice to remove every trace of stale wort from the glass. The inspection can be made through the glass, and once cleansed the cask is not liable to sourness or other defects inherent in the wooden casks, and consequently saves the sulfur-burning.

I claim—

1. In a cask for brewing or other purposes, the combination of end frames, lugs at intervals along said end frames, longitudinal ribs, lugs arranged at the ends of said ribs and connected to the first-referred-to lugs, and filling-in panels for the spaces within said end frames and between said ribs, substantially as set forth.

2. In a union-cask for brewing purposes, the combination of glass plates forming the surface or sides and ends of the cask, a pair of end frames provided with spindles, a number of ribs attached to and connecting such end frames, and cement for fixing the glass plates and rendering the joints fluid-tight, substantially as set forth.

3. In a union-cask for brewing purposes, the combination of a pair of end frames, a number of ribs connected to the end frames so as to form a framework, a pair of lugs at each corner of the end frames, a pair of lugs at each end of each rib coinciding with the lugs on the end frames and fixed thereto by bolts and nuts, a plate between each pair of end-frame lugs, a number of glass plates of the desired shape, and cement for fixing and rendering the joints fluid-tight, substantially as specified.

4. In a cask of the character described, the combination of end frames, lugs at intervals along said end frames, longitudinal ribs, lugs arranged at the ends of said ribs and connected to the first-referred-to lugs, a plate between each pair of end-frame lugs, and filling-in panels for the spaces between said ribs and within said end frames, substantially as set forth.

In testimony whereof I have hereunto set my hand in presence of two subscribing witnesses.

WILLIAM CUTLER.

Witnesses:
  E. HARPER,
  GRAHAM T. COX.